United States Patent
Christopher et al.

(10) Patent No.: US 10,073,687 B2
(45) Date of Patent: Sep. 11, 2018

(54) SYSTEM AND METHOD FOR CROSS-BUILDING AND MAXIMIZING PERFORMANCE OF NON-NATIVE APPLICATIONS USING HOST RESOURCES

(71) Applicant: American Megatrends, Inc., Norcross, GA (US)

(72) Inventors: Samvinesh Christopher, Suwanee, GA (US); Winston Thangapandian, Duluth, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 106 days.

(21) Appl. No.: 15/246,742

(22) Filed: Aug. 25, 2016

(65) Prior Publication Data

US 2018/0060050 A1    Mar. 1, 2018

(51) Int. Cl.
*G06F 8/52* (2018.01)

(52) U.S. Cl.
CPC ..................... *G06F 8/52* (2013.01)

(58) Field of Classification Search
CPC ........................................... G06F 8/52
USPC ................................ 717/136–139
See application file for complete search history.

(56) References Cited

U.S. PATENT DOCUMENTS

| | | | | |
|---|---|---|---|---|
| 6,091,897 A * | 7/2000 | Yates | .................. | G06F 9/45516 717/138 |
| 6,308,255 B1 * | 10/2001 | Gorishek, IV | ........ | G06F 9/3879 710/104 |
| 2014/0281008 A1 * | 9/2014 | Muthiah | ............. | H04L 29/0651 709/231 |
| 2015/0277914 A1 * | 10/2015 | Kelm | ....................... | G06F 9/52 712/226 |
| 2015/0317172 A1 * | 11/2015 | Efremov | ............. | G06F 11/3664 717/138 |

OTHER PUBLICATIONS

"Tool Interface Standard (TIS) Executable and Linking Format (ELF) Specification Version 1.2," May 1995, TIS Committee.*
"A Brief Introduction to Linux Containers with LXC," Nov. 25, 2013, <https://blog.scottlowe.org/2013/11/25/a-brief-introduction-to-linux-containers-with-lxc/>, p. 1-6.*
"What is binfmt_misc and how to enable/disable it?" Dec. 24, 2015, <https://access.redhat.com/solutions/1985633>, p. 1-2.*

* cited by examiner

*Primary Examiner* — Qing Chen
(74) *Attorney, Agent, or Firm* — Locke Lord LLP; Tim Tingkang Xia, Esq.

(57) ABSTRACT

Systems and methods for cross-building a non-native application on a computing device under a different architecture. In one example, the computing device may be a x86 host computing device, and the non-native application may be a non-x86 application intended to be executable on a non-x86 embedded system. To cross-build the application on the x86 host, the x86 host may provide a protected environment, such as a Linux container (LXC). The application and corresponding library files for the non-x86 embedded system are provided in the LXC. When the application is to be executed, the system determines that the application is non-x86, and loads a corresponding translator module to translate the non-x86 code of the application and the corresponding library files in the LXC to x86 code. Thus, the application may be executable in the LXC on the x86 host to access and utilize resources of the x86 host.

20 Claims, 4 Drawing Sheets

SYSTEM AND METHOD FOR CROSS-BUILDING AND MAXIMIZING PERFORMANCE OF NON-NATIVE APPLICATIONS USING HOST RESOURCES

FIELD

The present disclosure relates generally to embedded system technology, and more particularly to systems and methods for cross-building and maximizing performance of non-native applications for a non-x86 embedded system using resources of a host computing device under the x86 architecture.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An embedded system is a computer system with a dedicated function within a larger mechanical or electrical system, often with real-time computing constraints. Generally, for a developer to build applications or images in a non-x86 embedded system, such as Advanced RISC Machine (ARM), Microprocessor without Interlocked Pipeline Stages (MIPS) or SH4, the developer may have one of the following two options: (1) cross-building the application on a x86 system; or (2) native building the application on the non-x86 environment. The cross-building option may be performed using cross-build tools, which utilize host resources to maximize and create applications and images faster. However, not all non-x86 applications can be cross-complied on a host machine of the x86 system. On the other hand, the native building option depends highly on the native environment. However, embedded systems are generally low in the central processing unit (CPU) power, memory and storage size. Thus, it may take huge amount of time to perform native building on the native embedded systems, and sometimes it becomes impossible to perform native building because the systems may run out of resources.

Therefore, an unaddressed need exists in the art to address the aforementioned deficiencies and inadequacies.

SUMMARY

Certain aspects of the present disclosure direct to a system, which includes a computing device under a first architecture. The computing device includes a processor and a storage device storing computer executable code. The computer executable code, when executed at the processor, is configured to: provide a protected environment; provide an application executable under a second architecture in the protected environment, wherein the second architecture is different from and incompatible to the first architecture; and in response to a command to execute the application on the computing device, execute a translator module at the processor, wherein the translator module is configured to generate first code executable under the first architecture based on second code executable under the second architecture; convert, by the executed translator module, the application to a converted application executable under the first architecture; and execute, at the processor, the converted application in the protected environment, wherein the executed converted application is configured to access and utilize resources of the computing device.

In certain embodiments, the protected environment is a Linux container (LXC).

In certain embodiments, the first architecture is a x86 architecture, and the second architecture is a non-x86 architecture.

In certain embodiments, the computer executable code, when executed at the processor, is further configured to: provide a file system of a non-x86 embedded system in the LXC, wherein the application is executable in the non-x86 embedded system, and the file system comprises a plurality of library files accessible by the application; and in response to the command to execute the application on the computing device, convert, by the executed translator module, the library files to converted library files having x86 machine code, such that the converted library files are accessible by the converted application being executed in the LXC.

In certain embodiments, the translator module is provided in an application loader file.

In certain embodiments, the computer executable code is configured to execute the translator module at the processor by: accessing an organizational file of the application; determining, based on architecture information of the organizational file, that the application is executable under the second architecture; retrieving the translator module from the application loader file; and executing the translator module.

In certain embodiments, the organizational file is an executable and linkable format (ELF) file.

In certain embodiments, the application loader file is a binfmt_misc file to provide kernel support for miscellaneous binary formats.

Certain aspects of the present disclosure direct to a method for cross-building a non-native application on a computing device under a first architecture. The method includes: providing, on the computing device, a protected environment; providing an application executable under a second architecture in the protected environment, wherein the second architecture is different from and incompatible to the first architecture; and in response to a command to execute the application on the computing device, executing, on the computing device, a translator module, wherein the translator module is configured to generate first code executable under the first architecture based on second code executable under the second architecture; converting, by the executed translator module, the application to a converted application executable under the first architecture; and executing, on the computing device, the converted application in the protected environment, wherein the executed converted application is configured access resources of the computing device.

In certain embodiments, the protected environment is a LXC.

In certain embodiments, the first architecture is a x86 architecture, and the second architecture is a non-x86 architecture.

In certain embodiments, the method further includes: providing a file system of a non-x86 embedded system in the LXC, wherein the application is executable in the non-x86 embedded system, and the file system comprises a plurality of library files accessible by the application; and in response to the command to execute the application on the computing device, converting, by the executed translator module, the library files to converted library files having x86 machine code, such that the converted library files are accessible by the converted application being executed in the LXC.

In certain embodiments, the translator module is provided in an application loader file, and the translator module is executed by: accessing an organizational file of the application; determining, based on architecture information of the organizational file, that the application is executable under the second architecture; retrieving the translator module from the application loader file; and executing the translator module.

In certain embodiments, the organizational file is an ELF file, and the application loader file is a binfmt_misc file to provide kernel support for miscellaneous binary formats.

Certain aspects of the present disclosure direct to a non-transitory computer readable medium storing computer executable code. The computer executable code, when executed at a processor of a computing device under a first architecture, is configured to: provide a protected environment; provide an application executable under a second architecture in the protected environment, wherein the second architecture is different from and incompatible to the first architecture; and in response to a command to execute the application on the computing device, execute a translator module at the processor, wherein the translator module is configured to generate first code executable under the first architecture based on second code executable under the second architecture; convert, by the executed translator module, the application to a converted application executable under the first architecture; and execute, at the processor, the converted application in the protected environment, wherein the executed converted application is configured access resources of the computing device.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein.

DETAILED DESCRIPTION

Figure 1:
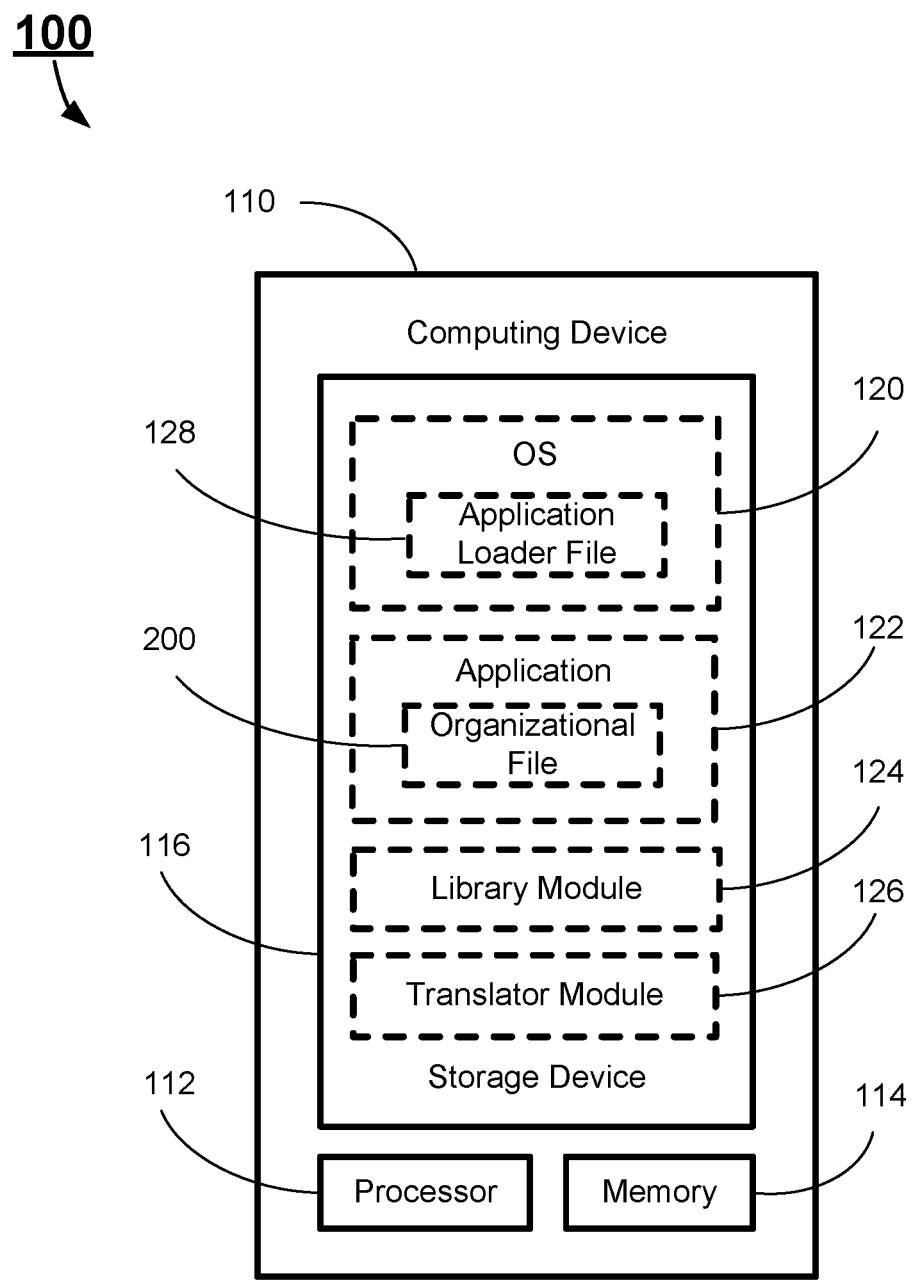
FIG. 1 schematically depicts a system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The present disclosure relates to computer systems applied on BMC simulator. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

As discussed above, for a developer to build applications or images in a non-x86 embedded system, such as ARM, MIPS, SH4 or other non-x86 system, the developer may choose to cross-build the application on a x86 system. The cross-building option may be performed using cross-build tools, which utilize host resources to maximize and create applications and images faster. However, not all non-x86 applications can be cross-complied on a host machine of the x86 system. To solve this problem, there is a need to emulate the embedded system on the host machine, so that the host resource may be used in cross-building the application.

Currently, a solution may be provided using QEMU (which is short for Quick Emulator). QEMU is a free and open-source hosted hypervisor that performs hardware virtualization. QEMU can work in two modes. In one of the two modes, QEMU translates the machine code of the embedded system to the host format, such that the non-native applications can be executed with good performance. However, QEMU does not emulate the entire embedded system environment. Thus, the code which depends on the libraries of the embedded system cannot be executed. A workaround to this problem is to statically build the applications along with the libraries. However, this workaround solution is not desirable, as it requires changes in the build scripts, and the size of the applications will be greatly increased, which has a huge impact on the cost.

Further, the other mode of QEMU emulates the entire embedded system (similar to a virtual machine) on the host machine. This solution works properly and allows the developer to perform native compilations and build applications for most of the cases. However, QEMU has certain limitations on how much host resources that may be used. Currently, QEMU can use only one CPU core of the host machine and reserves only 256 MB of the memory of the host machine. This limits the speed of the development of the application, and sometimes the resources (such as memory space) may run out when building big applications.

Thus, certain aspects of the present disclosure relate to a system for cross-building and maximizing performance of non-native applications for a non-x86 embedded system using resources of a host computing device under the x86 architecture.

FIG. 1 schematically depicts a system according to certain embodiments of the present disclosure. As shown in FIG. 1, the system 100 includes a computing device 110. The computing device 110 is a x86 computing device used as a host computer for cross-building and testing purposes for the applications for one or more non-x86 embedded systems. In other words, the computing device 110 is under the x86 architecture, and each of the applications to be cross-built on the computing device 110 is configured to be executable on a corresponding embedded system under a non-x86 architecture, which is different from and incompatible to the x86 architecture. In certain embodiments, the computing device 110 may be a standalone computer or one of the computers in an interconnected system. For example, the computing device 110 may be a general purpose computer, a specialized computer, or a server or a client in a client-server network. In certain embodiments, the computing device 110 may be a mobile device such as a laptop computer, a tablet computer, a hand-held computer, or any other types of computing device with computing functionalities under the x86 architecture. Indeed, the computing device 110 as shown in FIG. 1 only represents an exemplary embodiment of the present disclosure, and therefore should not be considered to limit the disclosure in any manner.

As shown in FIG. 1, the computing device 110 includes a processor 112, a memory 114, and a storage device 116. In certain embodiments, the computing device 110 may include other resources, including hardware components and software components (not shown), to perform its corresponding tasks. Examples of these hardware and software components may include, but not limited to, a network interface card (NIC), other required memory, interfaces, buses, Input/Output (I/O) modules and peripheral devices.

The processor 112 is configured to control operation of the computing device 110. In certain embodiments, the processor 112 may be a central processing unit (CPU). The processor 112 can execute any computer executable code or instructions, such as the hypervisor 140 and the virtual machines 150, or other applications and instructions of the computing device 110. In certain embodiments, the computing device 110 may run on more than one processor, such as two processors, four processors, eight processors, or any suitable number of processors.

The memory 114 can be a volatile memory, such as the random-access memory (RAM), for storing the data and information during the operation of the computing device 110. In certain embodiments, the memory 114 may be a volatile memory array. In certain embodiments, the computing device 110 may run on more than one memory 114.

The storage device 116 is a non-volatile data storage media for storing computer executable code or instructions for performing the operation of the computing device 110. In certain embodiments, the computer executable code or instructions of the computing device 110 may be implemented as one or more application programs or modules. Examples of the storage device 116 may include non-volatile memory such as flash memory, memory cards, USB drives, hard drives, floppy disks, optical drives, or any other types of data storage devices. In certain embodiments, the computing device 110 may have multiple storage devices 116, which may be identical storage devices or different types of storage devices.

As shown in FIG. 1, the applications or modules stored in the storage device 116 may include, without being limited thereto, an operating system (OS) 120, an application 122 executable on a corresponding non-x86 embedded system, a library module 124 for the non-x86 embedded system, and a translator module 126. Each of the applications or modules stored in the storage device 116 may be formed by computer executable code or instructions. In certain embodiments, each of the applications or modules may further include sub-modules. Alternatively, in certain embodiments, some or all of the applications or modules may be combined to form a single module.

The OS 120 includes a set of functional programs that control and manage operations of the computing device 110. In certain embodiments, the OS 120 may receive and manage the simulated signals from components of the computing device 110. The OS 241 may not realize that it is running on virtual machine and may perceive that it is running on a physical machine. In certain embodiments, the OS 120 is operable to multitask, i.e., execute computing tasks in multiple threads. In certain embodiments, the OS 120 may be any of the following: MICROSOFT CORPORATION's "WINDOWS 95," "WINDOWS CE," "WINDOWS 98," "WINDOWS 2000" or "WINDOWS NT", "WINDOWS Vista,", "WINDOWS 7," "WINDOWS 8," "WINDOWS 10" operating systems, IBM's OS/2 WARP, APPLE's MACINTOSH OSX operating system, LINUX, UNIX, etc. In one embodiment, the OS 120 may be Linux.

The application 122 is a computer program designed to perform a group of functions, tasks or activities. As discussed above, the application 122 is executable on a corresponding non-x86 embedded system. Accordingly, the application 122, without being processed by the translator module 126, is not directly executable at the processor 112 of the computing device 110.

In certain embodiments, the application 122 may include an organizational file 200, which follows a standard specification to introduce information of the layout of the application 122. In certain embodiments, the organizational file 200 may be an Executable and Linkable Format (ELF) file. In particular, the ELF file may include information sequence specific to different CPU architecture. Thus, the OS 120 may use this information to determine if the application 122 can be executed on a computing device under a specific architecture. For example, the application 122 is executable on a corresponding non-x86 embedded system. Thus, the ELF file of the application 122 may include the information identifying the application to be executable on the non-x86 architecture.

Figure 2:
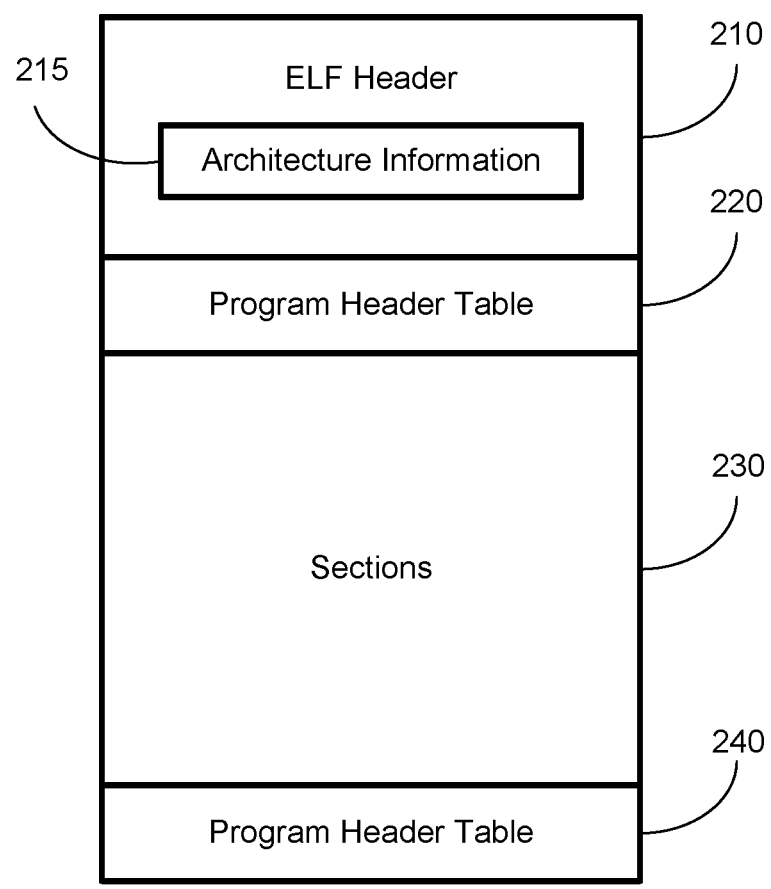
FIG. 2 schematically depicts an organizational file of an application according to certain embodiments of the present disclosure.

FIG. 2 schematically depicts an organizational file of an application according to certain embodiments of the present disclosure. As shown in FIG. 2, the organizational file 200 is an ELF file. The ELF file 200 includes an ELF header 210, an optional program header table 220, sections 230, and a section header table 240. The ELF header 210 resides at the beginning of the ELF file 200 and holds a road map describing the file's organization. The sections 230 may hold the bulk of object file information such as instructions, data, symbol table, and relocation information. In certain embodiments, the sections 230 may provide information of the library files needed by the application 122. The program header table 220, if present, tells the system how to create a process image. The section header table 240 contains information describing the files sections. Every section has an entry in the table; each entry gives information such as the section name, the section size, etc. In particular, the ELF header 210 includes the architecture information 215 of the application. In certain embodiments, the ELF header 210 may be a 32-bit or 64-bit header, and a 2-byte field at the 0x12 offset of the ELF header 210 may be an e_machine field, which includes information (e.g., a value) specifying the instruction set architecture of the application. For example, the value 0x03 indicates the x86 architecture, 0x08 indicates the MIPS architecture, and 0x28 indicates the ARM architecture.

Referring back to FIG. 1, the library module 124 is a module storing a plurality of library files for the non-x86 embedded system, which may be in the execution of the application 122. In certain embodiments, the library files of the library module 124 may include configuration information of the non-x86 embedded system, documentation, help data, message templates, pre-written code and subroutines, classes, values or type specifications, or any other data necessary for the application 124 to be executed. It should be noted that, although FIG. 1 shows the library module 124 as a collective module of the library files, each library file may be independent and separate from one another, and may be stored in different locations and executed independently in different threads. In certain embodiments, a file system of the non-x86 embedded system may be provided, and the file system includes the files of the application 122 and the library files of the library module 124. Since the library files of the library module 124 are provided in the file system of the non-x86 embedded system, the library files are not directly executable at the processor 112 of the computing device 110 without being processed by the translator module 126.

The translator module 126 is a translator program dedicated to the non-x86 embedded system. In particular, the translator module 126 is configured to generate first code executable under the x86 architecture based on second code executable under the non-x86 architecture. For example, the translator module 126 may convert the application 122, which is not directly executable at the processor 112 of the computing device 110, to a converted application executable under the x86 architecture, and may convert the library files required by the application 122 to converted library files executable under the x86 architecture, such that the converted application and the converted library files may be executable at the processor 112 of the computing device 110. It should be particularly noted that the computing device 110 may provide multiple different translator modules 126 to correspond to different non-x86 architectures. For example, one of the translator modules 126 may be provided for the ARM architecture, and another of the translator modules 126 may be provided for the MIPS architecture.

In certain embodiments, when the OS 120 is Linux, the OS 120 may provide certain features that may be used to allow cross-building of the application 122 on the x86 computing device 110. In certain embodiments, the OS 120 may provide a feature of a protected environment. For example, the protected environment may be a Linux container (LXC). Other different OS may provide similar features of the protected environment, such as the "jail" provided by FreeBSD. Specifically, the LXC feature allows a user to create a separate protected environment with a file system (e.g., the file system of the library module 124), which may run without affecting the file system of the computing device 110 (i.e., the file system out of the LXC). Applications running in the LXC can still access the entire resources of the computing device 110. In this case, any applications may run within the LXC with only one restriction: since the applications must be executed at the processor 112 of the computing device 110, the file system of the LXC should match the x86 architecture of the computing device 110. In other words, the LXC created on the computing device 110, as well as any application or file system running within the LXC, should be under the x86 architecture. Accordingly, simply copying the application 122 and the corresponding file system with the library files into the LXC does not make the application 122 to be executable at the processor 112 of the computing device 120.

In certain embodiments, the OS 120 may include an application loader file 128. For example, when the OS 120 is Linux, the application loader file 128 may be a binfmt_misc file, which provides kernel support for miscellaneous binary formats. Specifically, the binfmt_misc file is a Linux kernel feature, which allows the user to invoke almost every program by simply typing the name of the program in the shell. In certain embodiments, the binfmt_misc feature allows the user to specify different application loaders to different architecture information, which may be obtained from the ELF file of the application 122. When the application 122 is called to launch, the Linux OS 120 may match the information obtained from the ELF file of the application 122 with the application loader information defined in the binfmt_misc file, and determine the translator module 126 for the application 122. Thus, the translator module 126 may run to convert the application 122 and corresponding library files in the LXC to converted application and converted library files, such that the converted application may be executable at the processor 112 of the computing device 120.

In certain embodiments, the OS 120 may include customized code or instructions that may allow cross-building of the application 122 on the x86 computing device 110. In certain embodiments, the code or instructions may be in the form of a sub-module of the OS 120. In operation, the OS 120 (or more specifically, the sub-module of the OS 120) may provide a LXC, and the user may copy the file system of the non-x86 embedded system (which includes the application 122 and the library files of the library module 124) into the LXC. At this point, the application 122 is not executable on the x86 computing device 110. Thus, when the user inputs a command to execute the application 122, the OS 120 (or more specifically, the sub-module of the OS 120) may access the organizational file 200 (e.g., the ELF file) of the application 122 to obtain the architecture information, and then determine, based on the architecture information, that the application is executable under a specific non-x86 architecture. Thus, the OS 120 (or more specifically, the sub-module of the OS 120) may check the application loader file 128 (e.g., the binfmt_misc file) to determine the corresponding translator module 126 for the specific non-x86 architecture, and execute the translator module 126. The translator module 126 then converts the application 122 in the LXC to a converted application, which has the machine code executable under the x86 architecture. If the application 122 requires certain library files, the translator module 126 also converts the library files in the LXC to converted library files. Thus, the converted application in the LXC may be executed on the computing device 110. For the computing device 110 and the OS 120, the executed converted application looks like a normal x86 application. Thus, the executed converted application may access and utilize resources of the computing device 110. Further, since the converted application runs in the LXC, which is a protected environment, it runs without affecting the other part of the computing device 110.

Figure 3:
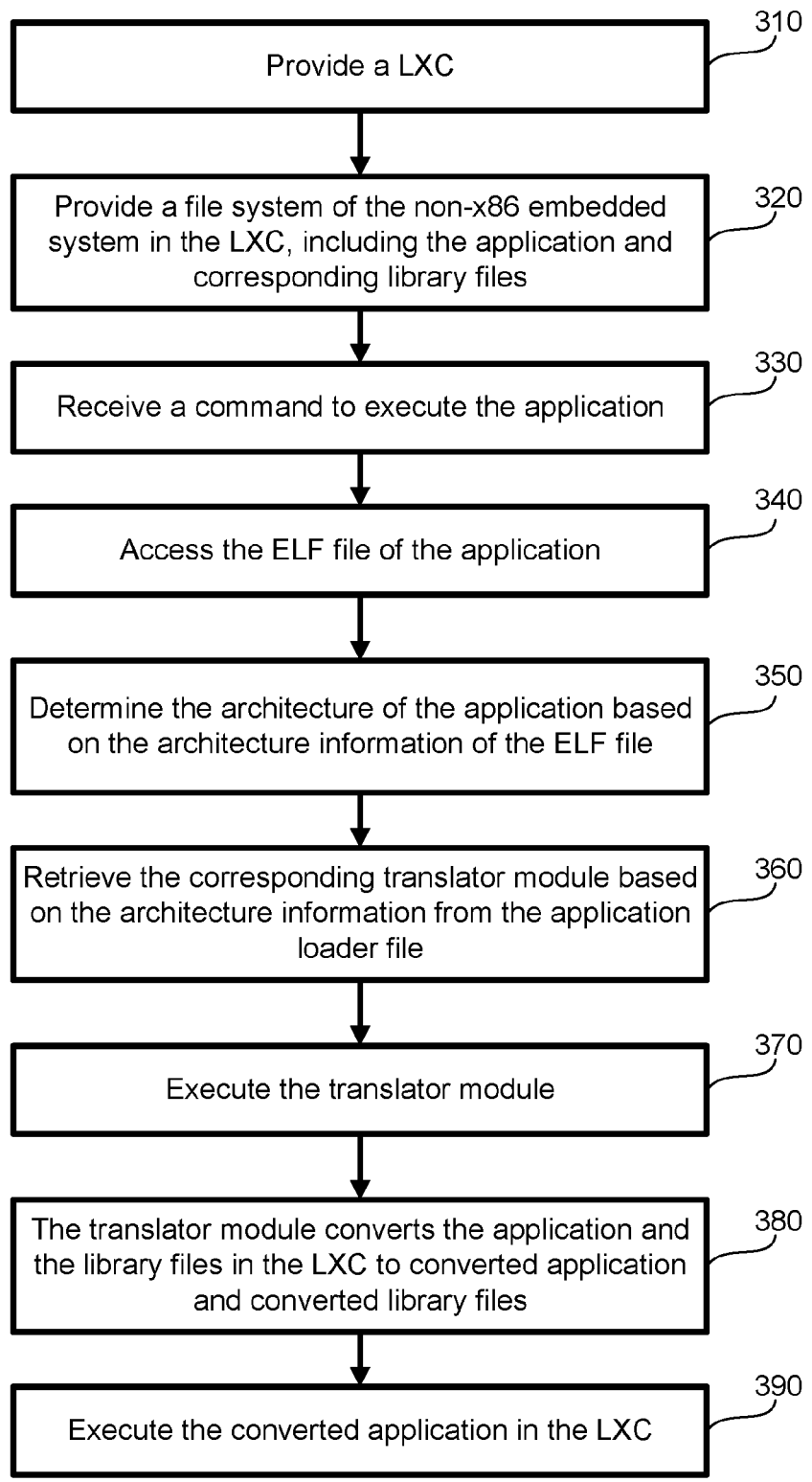
FIG. 3 depicts a flowchart of cross-building a non-native application on a computing device under a first architecture according to certain embodiments of the present disclosure.

A further aspect of the present disclosure is directed to a method for cross-building a non-native application on a computing device under a first architecture. FIG. 3 schematically depicts a flowchart of cross-building a non-native application on a computing device under a first architecture according to certain embodiments of the present disclosure. In certain embodiments, the method as shown in FIG. 3 may be implemented on a system as shown in FIG. 1. It should be particularly noted that, unless otherwise stated in the present disclosure, the steps of the method may be arranged in a different sequential order, and are thus not limited to the sequential order as shown in FIG. 3.

As shown in FIG. 3, at procedure 310, the system (more specifically, the sub-module of the OS 120) may provide a LXC for a file system of a specific non-x86 embedded system. At procedure 320, the system may provide the file system of the non-x86 embedded system in the LXC. The file system includes the application 122 and the library files of the library module 124. At this point, the application 122 is not executable on the x86 computing device 110.

At procedure 330, the system receives a command to execute the application 122. To determine whether the application 122 is executable on the x86 computing device 110, at procedure 340, the system accesses the ELF file of the application 122. At procedure 350, the system determines the architecture of the application 122 based on the architecture information of the ELF file. Since the application 122 is executable on the non-x86 embedded system, the architecture information will indicate the information of the specific non-x86 architecture of the embedded system.

At procedure 360, the system may retrieve the corresponding translator module 126 based on the architecture information from the application loader file 128. As discussed above, the system may provide multiple different translator modules 126 to correspond to different non-x86 architectures. Thus, the system may retrieve the corresponding translator module 126 based on the specific architecture of the embedded system. For example, if the architecture information of the ELF file indicates that the application is executable under the ARM architecture, the system may retrieve the translator module 126 specific for the ARM architecture. Once the translator module 126 is retrieved, at procedure 370, the translator module 126 is executed. At procedure 380, the executed translator module 126 converts the application 122 and the library files in the LXC to converted application and converted library files. At procedure 390, the converted application may be executed in the LXC.

Figure 4:
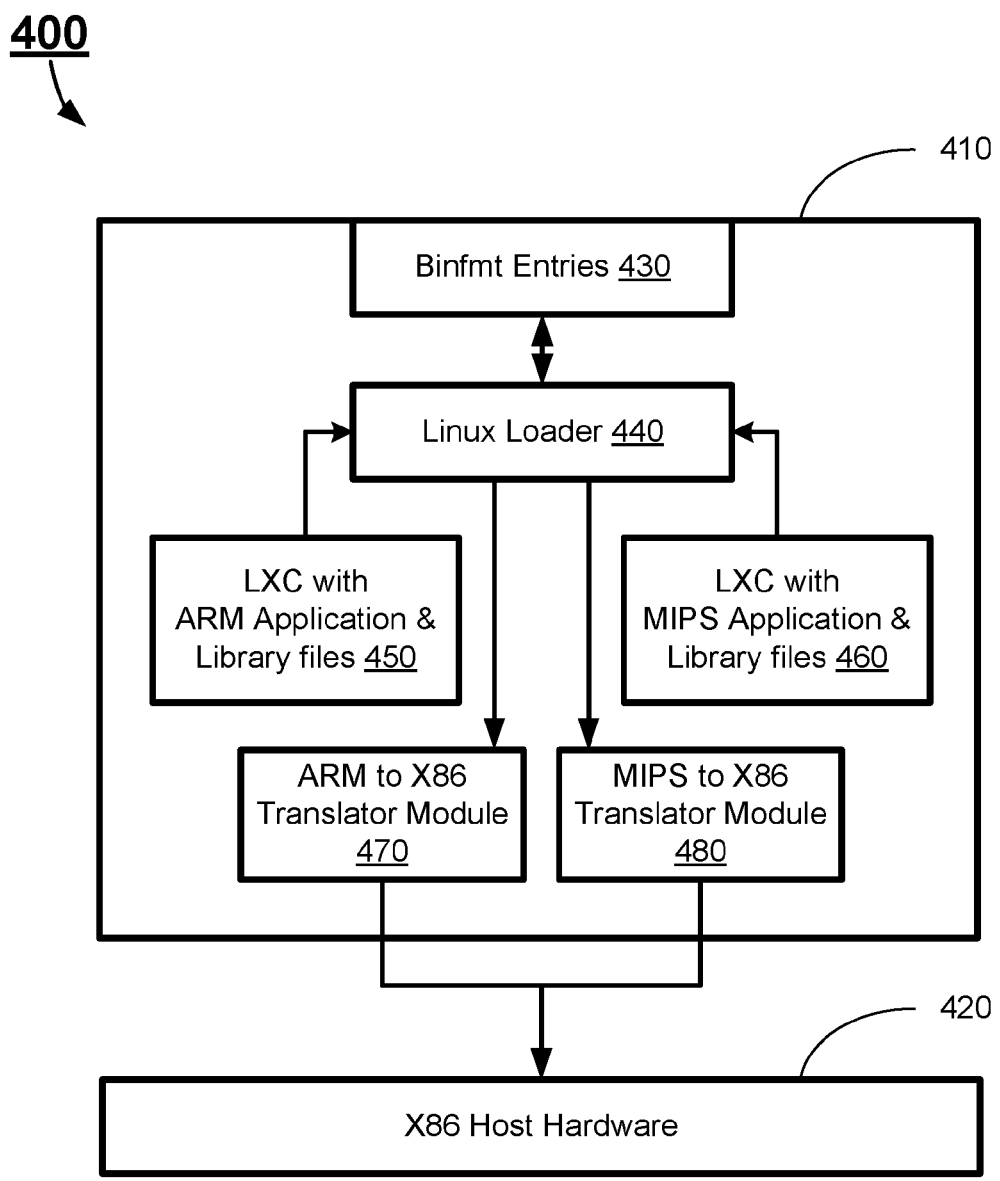
FIG. 4 schematically depicts a system for cross-building multiple non-native applications under different non-x86 architectures in multiple containers on a computing device according to certain embodiments of the present disclosure.

FIG. 4 schematically depicts a system for cross-building multiple non-native applications under different non-x86 architectures in multiple containers on a computing device according to certain embodiments of the present disclosure. As shown in FIG. 4, the system 400 may include two different applications provided on the same x86 computing device for cross-building purposes. The x86 computing device includes the x86 Linux environment 410, and the host hardware 420. In the x86 Linux environment 410, a binfmt_misc file 430 is provided to provide the kernel support for miscellaneous binary formats. Further, the Linux loader 440 may load the different translator modules, including an ARM-to-x86 translator module 470 and a MIPS-to-x86 translator module 480, based on the command to execute different applications in the LXC 450 (for the ARM application and library files) or the LXC 460 (for the MIPS application and library files). In either case, the executed converted application may access and utilize the resources of the computing device, such as the host hardware 420.

In a further aspect, the present disclosure is related to a non-transitory computer readable medium storing computer executable code. The computer executable code, when executed at one or more processor, may perform the method as described above. In certain embodiments, the non-transitory computer readable medium may include, but not limited to, any physical or virtual storage media. In certain embodiments, the non-transitory computer readable medium may be implemented as the storage device 116 of the computing device 110 as shown in FIG. 1.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
  a computing device under a first architecture, comprising a processor and a storage device storing computer executable code and a plurality of translator modules corresponding to a plurality of non-x86 architectures, wherein the first architecture is a x86 architecture, wherein each of the plurality of translator modules corresponds to a different one of the plurality of non-x86 architectures, and wherein the computer executable code, when executed by the processor, is configured to:
    provide, on the computing device, a protected environment;
    provide an application executable under a second architecture in the protected environment, wherein the second architecture of the application is one of the plurality of non-x86 architectures and is different from and incompatible to the first architecture; and
    in response to a command to execute the application on the computing device,
      determine, from the plurality of non-x86 architectures, the second architecture of the application based on architecture information;
      in response to determining the second architecture of the application based on the architecture information, retrieve, from the plurality of translator modules, a corresponding translator module corresponding to the second architecture of the application;
      execute, on the computing device, the retrieved corresponding translator module, wherein the retrieved corresponding translator module is configured to generate first code executable under the first architecture based on second code executable under the second architecture of the application;
      convert, by the executed retrieved corresponding translator module, the application to a converted application executable under the first architecture; and
      execute, on the computing device, the converted application in the protected environment, wherein the executed converted application is configured to access and utilize resources of the computing device.

2. The system as claimed in claim 1, wherein the protected environment is a Linux container (LXC).

3. The system as claimed in claim 2, wherein the plurality of non-x86 architectures comprises an Advanced RISC Machine (ARM) architecture and a Microprocessor without Interlocked Pipeline Stages (MIPS) architecture.

4. The system as claimed in claim 3, wherein the computer executable code, when executed by the processor, is further configured to:
  provide a file system of a non-x86 embedded system in the LXC, wherein the application is executable in the non-x86 embedded system, and the file system comprises a plurality of library files accessible by the application; and
  in response to the command to execute the application on the computing device, convert, by the executed retrieved corresponding translator module, the plurality of library files to converted plurality of library files having x86 machine code, such that the converted plurality of library files are accessible by the converted application being executed in the LXC.

5. The system as claimed in claim 2, wherein each of the plurality of translator modules is provided in an application loader file.

6. The system as claimed in claim 5, wherein the computer executable code is further configured to execute the retrieved corresponding translator module by the processor by:
  accessing an organizational file of the application;
  determining, based on architecture information of the organizational file of the application, that the application is executable under the second architecture;
  retrieving the corresponding translator module corresponding to the second architecture from the application loader file; and
  executing the retrieved corresponding translator module.

7. The system as claimed in claim 6, wherein the organizational file of the application is an executable and linkable format (ELF) file.

8. The system as claimed in claim 5, wherein the application loader file is a binfmt_misc file to provide kernel support for miscellaneous binary formats.

9. A method for cross-building a non-native application on a computing device under a first architecture, the method comprising:
  providing, on the computing device, a protected environment, wherein the computing device stores a plurality of translator modules corresponding to a plurality of non-x86 architectures, wherein the first architecture is a x86 architecture, and wherein each of the plurality of translator modules corresponds to a different one of the plurality of non-x86 architectures;

providing an application executable under a second architecture in the protected environment, wherein the second architecture of the application is one of the plurality of non-x86 architectures and is different from and incompatible to the first architecture; and in response to a command to execute the application on the computing device, determining, from the plurality of non-x86 architectures, the second architecture of the application based on architecture information;

in response to determining the second architecture of the application based on the architecture information, retrieving, from the plurality of translator modules, a corresponding translator module corresponding to the second architecture of the application;

executing, on the computing device, the retrieved corresponding translator module, wherein the retrieved corresponding translator module is configured to generate first code executable under the first architecture based on second code executable under the second architecture of the application;

converting, by the executed retrieved corresponding translator module, the application to a converted application executable under the first architecture; and executing, on the computing device, the converted application in the protected environment, wherein the executed converted application is configured to access and utilize resources of the computing device.

10. The method as claimed in claim 9, wherein the protected environment is a Linux container (LXC).

11. The method as claimed in claim 10, wherein the plurality of non-x86 architectures comprises an Advanced RISC Machine (ARM) architecture and a Microprocessor without Interlocked Pipeline Stages (MIPS) architecture.

12. The method as claimed in claim 11, further comprising:

providing a file system of a non-x86 embedded system in the LXC, wherein the application is executable in the non-x86 embedded system, and the file system comprises a plurality of library files accessible by the application; and in response to the command to execute the application on the computing device, converting, by the executed retrieved corresponding translator module, the plurality of library files to converted plurality of library files having x86 machine code, such that the converted plurality of library files are accessible by the converted application being executed in the LXC.

13. The method as claimed in claim 10, wherein each of the plurality of translator modules is provided in an application loader file, and the retrieved corresponding translator module is executed by:

accessing an organizational file of the application;

determining, based on architecture information of the organizational file of the application, that the application is executable under the second architecture;

retrieving the corresponding translator module corresponding to the second architecture from the application loader file; and executing the retrieved corresponding translator module.

14. The method as claimed in claim 13, wherein the organizational file of the application is an executable and linkable format (ELF) file, and wherein the application loader file is a binfmt_misc file to provide kernel support for miscellaneous binary formats.

15. A non-transitory computer readable medium storing computer executable code, wherein the computer executable code, when executed by a processor of a computing device under a first architecture, is configured to:

provide, on the computing device, a protected environment, wherein the computing device stores a plurality of translator modules corresponding to a plurality of non-x86 architectures, wherein the first architecture is a x86 architecture, and wherein each of the plurality of translator modules corresponds to a different one of the plurality of non-x86 architectures;

provide an application executable under a second architecture in the protected environment, wherein the second architecture of the application is one of the plurality of non-x86 architectures and is different from and incompatible to the first architecture; and in response to a command to execute the application on the computing device, determine, from the plurality of non-x86 architectures, the second architecture of the application based on architecture information;

in response to determining the second architecture of the application based on the architecture information, retrieve, from the plurality of translator modules, a corresponding translator module corresponding to the second architecture of the application;

execute, on the computing device, the retrieved corresponding translator module, wherein the retrieved corresponding translator module is configured to generate first code executable under the first architecture based on second code executable under the second architecture of the application;

convert, by the executed retrieved corresponding translator module, the application to a converted application executable under the first architecture; and execute, on the computing device, the converted application in the protected environment, wherein the executed converted application is configured to access and utilize resources of the computing device.

16. The non-transitory computer readable medium as claimed in claim 15, wherein the protected environment is a Linux container (LXC).

17. The non-transitory computer readable medium as claimed in claim 16, wherein the plurality of non-x86 architectures comprises an Advanced RISC Machine (ARM) architecture and a Microprocessor without Interlocked Pipeline Stages (MIPS) architecture.

18. The non-transitory computer readable medium as claimed in claim 17, wherein the computer executable code, when executed by the processor of the computing device under the first architecture, is further configured to:

provide a file system of a non-x86 embedded system in the LXC, wherein the application is executable in the non-x86 embedded system, and the file system comprises a plurality of library files accessible by the application; and in response to the command to execute the application on the computing device, convert, by the executed retrieved corresponding translator module, the plurality of library files to converted plurality of library files having x86 machine code, such that the converted plurality of library files are accessible by the converted application being executed in the LXC.

19. The non-transitory computer readable medium as claimed in claim 16, wherein each of the plurality of translator modules is provided in an application loader file, and the computer executable code is further configured to execute the retrieved corresponding translator module by the processor of the computing device under the first architecture by:
   accessing an organizational file of the application;
   determining, based on architecture information of the organizational file of the application, that the application is executable under the second architecture;
   retrieving the corresponding translator module corresponding to the second architecture from the application loader file; and
   executing the retrieved corresponding translator module.

20. The non-transitory computer readable medium as claimed in claim 19, wherein the organizational file of the application is an executable and linkable format (ELF) file, and wherein the application loader file is a binfmt_misc file to provide kernel support for miscellaneous binary formats.

* * * * *